United States Patent [19]

Garnweidner

[11] Patent Number: 4,915,442
[45] Date of Patent: Apr. 10, 1990

[54] DOOR REINFORCEMENT FOR MOTOR VEHICLES

[75] Inventor: Peter Garnweidner, Salzburg, Austria

[73] Assignee: Austria Metall Aktiengesellschaft, Braunau am Inn, Austria

[21] Appl. No.: 226,646

[22] Filed: Aug. 1, 1988

[30] Foreign Application Priority Data

Jul. 31, 1987 [AT] Austria .................................. 1942/87

[51] Int. Cl.$^4$ ................................................. B60J 5/04
[52] U.S. Cl. ................................................... 296/188
[58] Field of Search ............... 296/188, 189, 146, 201, 296/209; 52/222, 223 R

[56] References Cited

U.S. PATENT DOCUMENTS

| 2,150,476 | 3/1939 | Woodall | 52/222 |
| 3,720,076 | 10/1972 | Forsting et al. | 296/146 X |
| 3,776,588 | 12/1973 | Sobajima et al. | 296/146 |
| 3,819,228 | 6/1974 | Cornacchia | 296/188 X |
| 3,868,141 | 2/1975 | Johnson | 296/189 |
| 3,868,796 | 3/1975 | Bush | 296/146 X |
| 3,887,227 | 6/1975 | Deckert | 296/188 |
| 3,893,273 | 7/1975 | Sailor | 52/223 X |
| 4,056,280 | 11/1977 | Bauer et al. | 296/201 X |
| 4,290,235 | 9/1981 | Jahnle et al. | 296/188 X |
| 4,451,518 | 5/1984 | Miura et al. | 296/188 X |
| 4,462,633 | 7/1984 | Maeda | 296/188 |
| 4,488,751 | 12/1984 | Kling | 296/188 X |
| 4,750,779 | 6/1988 | Van Rooij | 296/188 |

FOREIGN PATENT DOCUMENTS 2045875 3/1972 Fed. Rep. of Germany .

Primary Examiner—Margaret A. Focarino
Assistant Examiner—Frank H. Williams, Jr.
Attorney, Agent, or Firm—Herbert Dubno

[57] ABSTRACT

A door reinforcement to protect a car against sideways collision has at least one tensile bracing band in the door structure attached to supports which are advantageously parallel.

8 Claims, 9 Drawing Sheets

DOOR REINFORCEMENT FOR MOTOR VEHICLES

FIELD OF THE INVENTION

My present invention relates to a reinforcing structure for the door of a motor vehicle, this structure being suitable for minimizing the effect of a collision.

BACKGROUND OF THE INVENTION

The usual reinforcing or strengthening means used in doors for motor vehicles consists of horizontal supports or beams, attached to the vertical door struts. The protective effect of such reinforcements is limited to a certain height of the colliding body. Doors of this design are heavy, since the forces are conducted to the vertical struts of the doorway, which must be built in a very sturdy manner. Therefore, a door of this sort is costly to construct. The involvement of the door sill as well as the rest of the car body when the door is deformed in a collision is achieved only to a very inadequate extent.

OBJECTS OF THE INVENTION

It is a principal object of my invention to provide a door reinforcement for a motor vehicle which affords effective protection against impact over a more extended range than heretofore.

It is a further object to make available such a reinforcement which permits lighter weight and more economical construction, and which distributes the force of any deformation more evenly to the door sill and to the entire car body.

SUMMARY OF THE INVENTION

The above and other objects of the invention are achieved in a door reinforcement for a motor vehicle which has at least one tensile bracing band in the door structure, this member being advantageously attached to substantially parallel supports.

A door constructed with reinforcement in accordance with my invention is lighter than a door with the prior art mode of reinforcement. It offers protection from impacting objects which is substantially independent of the height of the impact. The tensile bracing band is integrated into the overall construction of the door and is economical to build. It transmits the energy of deformation of the door more evenly to the door sill and car body.

In a further feature of my invention, the first tensile bracing band nearest the outer door covering (skin) can be attached to horizontal supports. The uppermost of these supports is configured to form the outer sealing edge for the window, and a further horizontal support is configured to form the inner sealing edge for the bottom of the window.

The two adjacent longitudinal sides of these two supports are configured so that they fit conformably into one another. In this way, if they are deformed in a sideways collision, they link or hook into one another and thus provide a transverse bracing support to the door structure on which the tensile bracing band finds support. The lower horizontal support forms the spacer (thickness defining member) for the door structure and it is shaped so that the door sill structure fits it conformably lengthwise. In this way, it is provided that the support and the door sill will link or hook into one another in the event of a sideways collision, thus transmitting the stress of the collision further into the car body, and thus providing a strong reinforcing support for the tensile bracing band.

The tensile bracing band can be attached to the supports by means of bolts, adhesives, or by wedge (key) linking means. It is advantageous in a wedge linkage to attach the tensile bracing band in such a way that under tensile load it is pulled more tightly into the wedge linkage recess or receptacle. The tensile bracing band may be clamped in to various degrees of tightness, for example by adjusting the tension applied by such a wedge linkage, which has an effect on the resonant frequency of the door and allows adjustment of the sound made by the door when it swings shut.

In a another feature of my invention, further protection can be provided by having, between the outer covering of the door and the tensile bracing band, a filler material for increasing the initial resistance to deformation, or by having a second tensile bracing band constructed behind the first one and attached to the vertical door strut and, in a further feature of my invention, by having the vertical strut of the door configured so as to fit conformably into the vertical strut of the car body.

If, in the course of a sideways collision, the door is pushed in to the extent that this second tensile bracing band is reached and actually deformed, then the force taken up by this second tensile bracing band is transmitted further on to the vertical strut of the door, which by virtue of its conformable fit into the vertical strut of the car body, transmits the force thereto. In this way, the force of the impact is imparted in a more evenly distributed way to the car body, thus increasing the overall sturdiness of the car construction.

The second tensile bracing band can also be used as a multipurpose support.

The band can be a high tensile strength fabric, a steel band under tension or an array of parallel fibers under pretension. The fabric or fibers can be resin-impregnated graphite or boron fibers.

BRIEF DESCRIPTION OF THE DRAWINGS

The above and other objects, features and advantages of the present invention will become more readily apparent from the following description, reference being made to the accompanying highly diagrammatic drawing in which.

SPECIFIC DESCRIPTION

Figure 1:
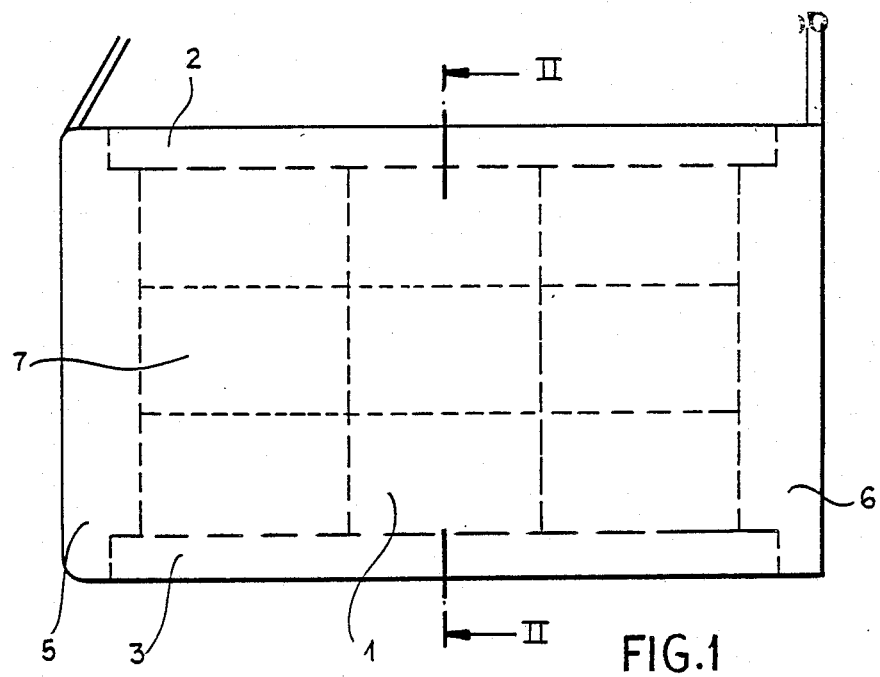
FIG. 1 is a diagrammatic front elevational view of the door in accordance with the invention.
Figure 2:
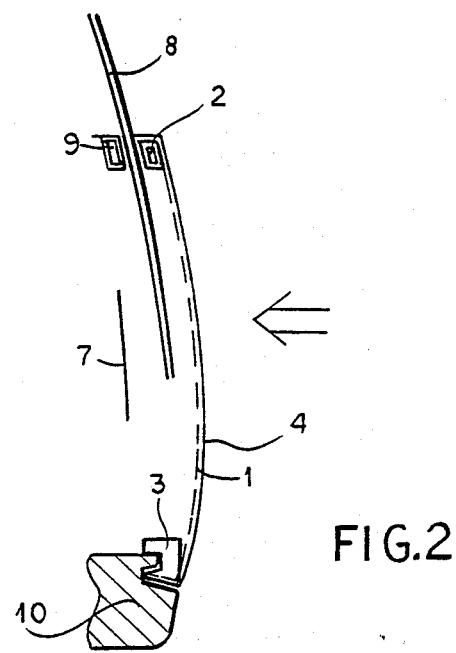
FIG. 2 is a section through the door in accordance with the invention taken along the line II—II of FIG. 1.

The tensile bracing band 1 is constructed between horizontal supports 2 and 3 and is located close behind the outer covering (skin) 4 of the door. The supports 2 and 3 are firmly bonded to the vertical supports 5 and 6.

The second tensile bracing band 7 more remote from the outer covering 4 is directly mounted on the vertical supports 5 and 6. The support 2 constitutes the outer sealing edge for the window 8 and a further support 9, which is firmly bonded to the supports 5 and 6, forms the inner sealing edge for the window.

The adjacent lengthwise sides of the supports 2 and 9 are constructed so that by deformation from outside (direction shown by arrow), they hook into one another and thereby produce a firm load-bearing support.

The support 3 is shaped so that it is encompassed lengthwise by the door sill and hooks into it if the door is subjected to a sideways collision.

Figure 3:
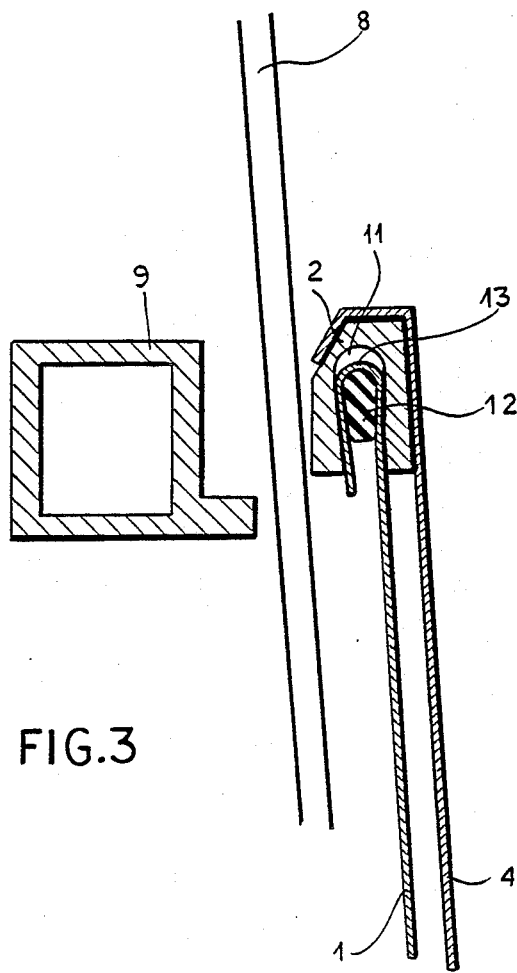
FIG. 3 is a detail view, showing the construction of the support at the lower edge of the door windowpane.

FIG. 3 shows the attachment of the tensile bracing band 1 onto the support 2 by means of a lengthwise recess 11 which opens downward and has a tapered configuration, into which the keypiece (wedge) 12 fits, this keypiece being inserted into the bent-over upper extremity 13 of the tensile bracing band 1 which inserts into the lengthwise recess 11, thus attaching the tensile bracing band 1 to the the support 2.

Figure 4:
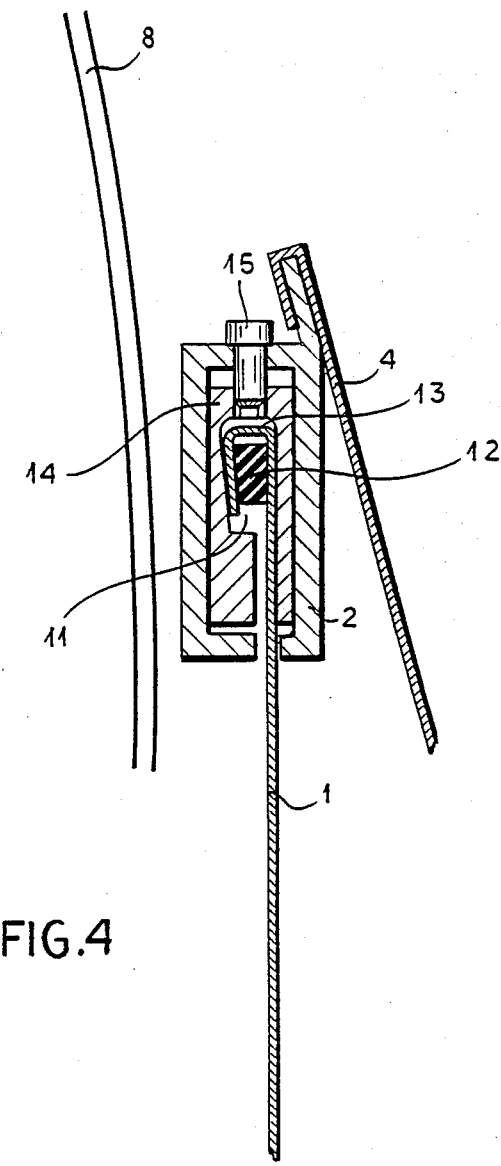
FIG. 4 is a detail view of a variant thereof.

FIG. 4 shows a variant wherein, in the support 2, there is located a profiled piece 14 in which the previously-described mode of attachment takes place. By means of the bolt 15, which screws into the profiled piece 14 from the upper side of the support 2, this attachment is slidably adjustable. Thereby, the tension on the tensile bracing band 1 can be adjusted.

Figure 5:
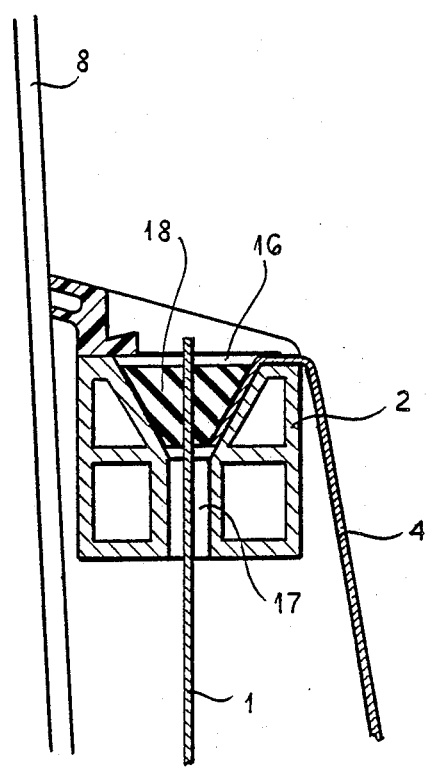
FIG. 5 is a view of another variant thereof.

FIG. 5 shows another variant of the linkage of the support 2 with the tensile bracing band 1, wherein the support 2 on its upper side has an upwardly-open lengthwise groove 16 and also has a vertical lengthwise slot 17 in the region of the attachment of the tensile bracing band. The tensile bracing band 1 is inserted through this slot 17 and is held firmly by a clamping piece 18 which lies in the lengthwise groove 16. Also, the clamping piece 18 firmly holds the outer covering 4 of the door.

Figure 6:
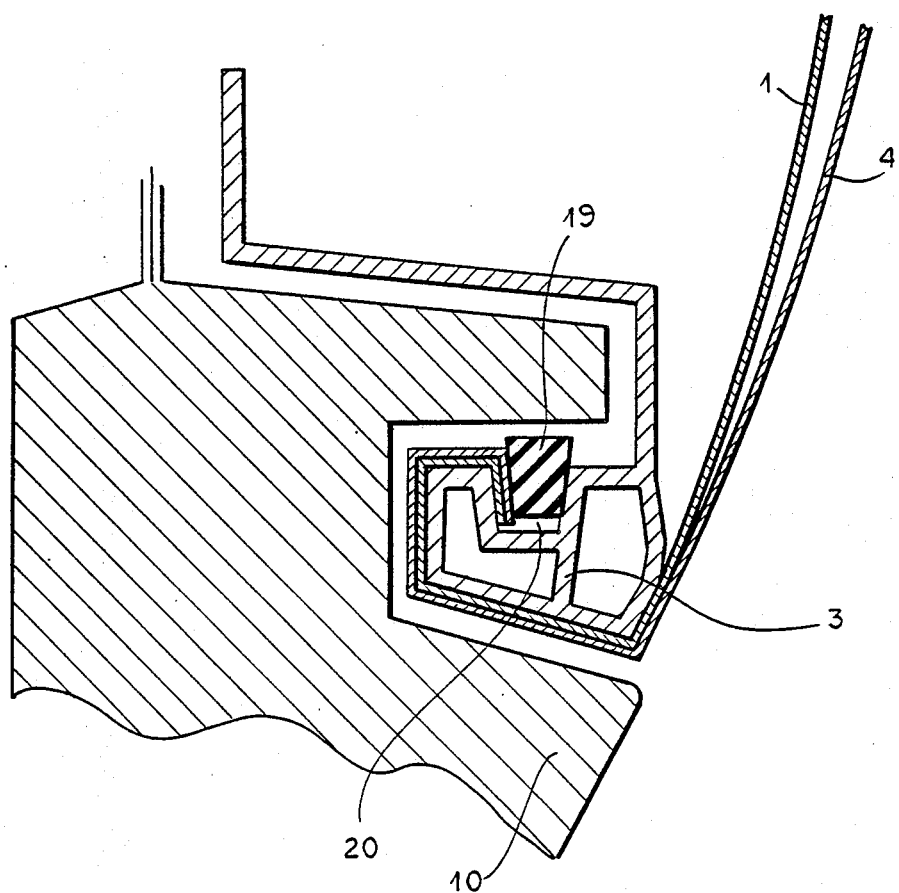
FIG. 6 is a detail view showing one embodiment of the lower support and the door sill.
Figure 7:
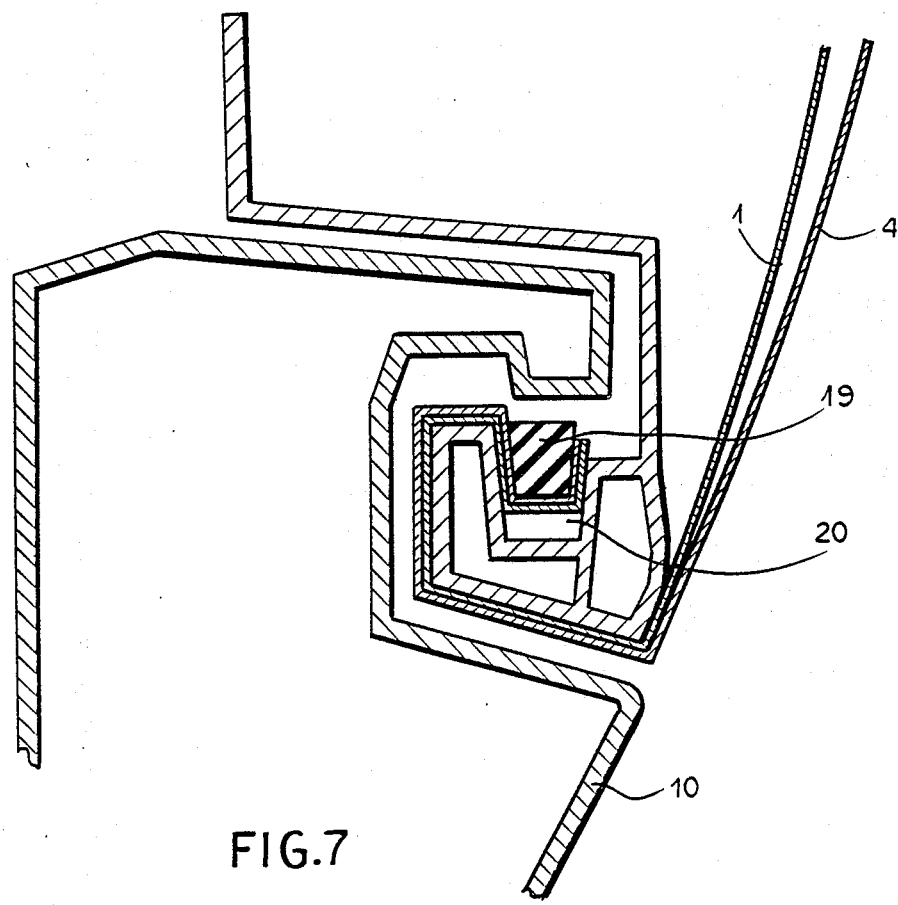
FIG. 7 is a view of a variant of this detail.

FIGS. 6 and 7 show advantageous design features for a key (wedge) linkage of the tensile bracing band 1 with the support 3. The outer covering 4 and the tensile bracing band 1 are bent around the lower horizontal support 3 and clamped into a lengthwise groove 20 in the support 3 by means of a profiled key piece or wedge 19.

By means of the two-way hooking together shown in FIG. 7, the bending stiffness is even further increased in comparison to the variant in FIG. 6.

Figure 8:
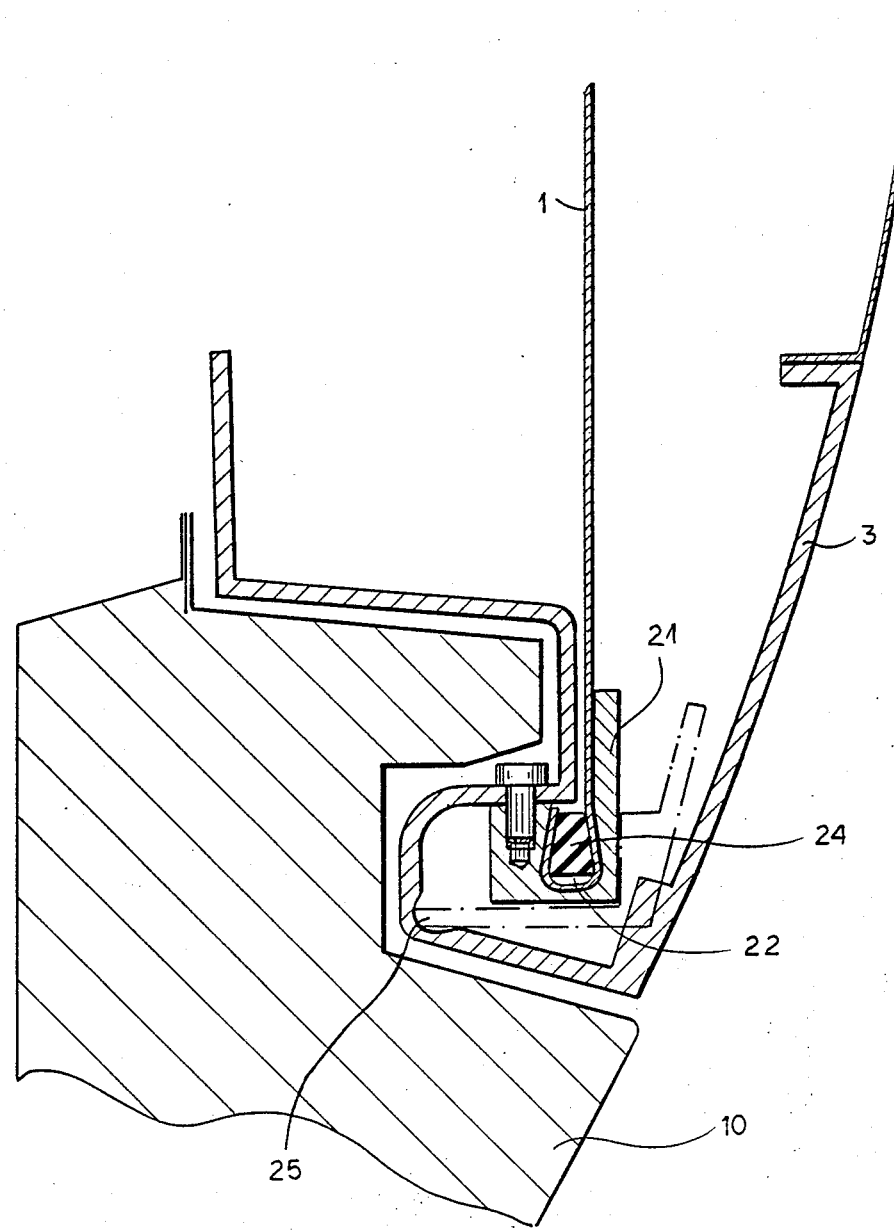
FIG. 8 is a view of another variant of this detail.

In FIG. 8, an attachment of the tensile bracing band 1 to the support 3 is shown, in which the attachment of the tensile bracing band 1 is accomplished by means of the insertion of the tensile bracing band 1 into a profiled piece 21 which has a lengthwise recess 22 into which the lower bent-around edge of the tensile bracing band 1 is inserted and fixed in place by the key piece 24. This profile piece 21 is encompassed by the support 3. An intentionally-bendable place 25 is provided at the lower inner edge of the door sill. The dashed lines show the support 3 as it would bend around the profiled piece 21 so as to give it additional support if the door is deformed by impact.

Figure 9:
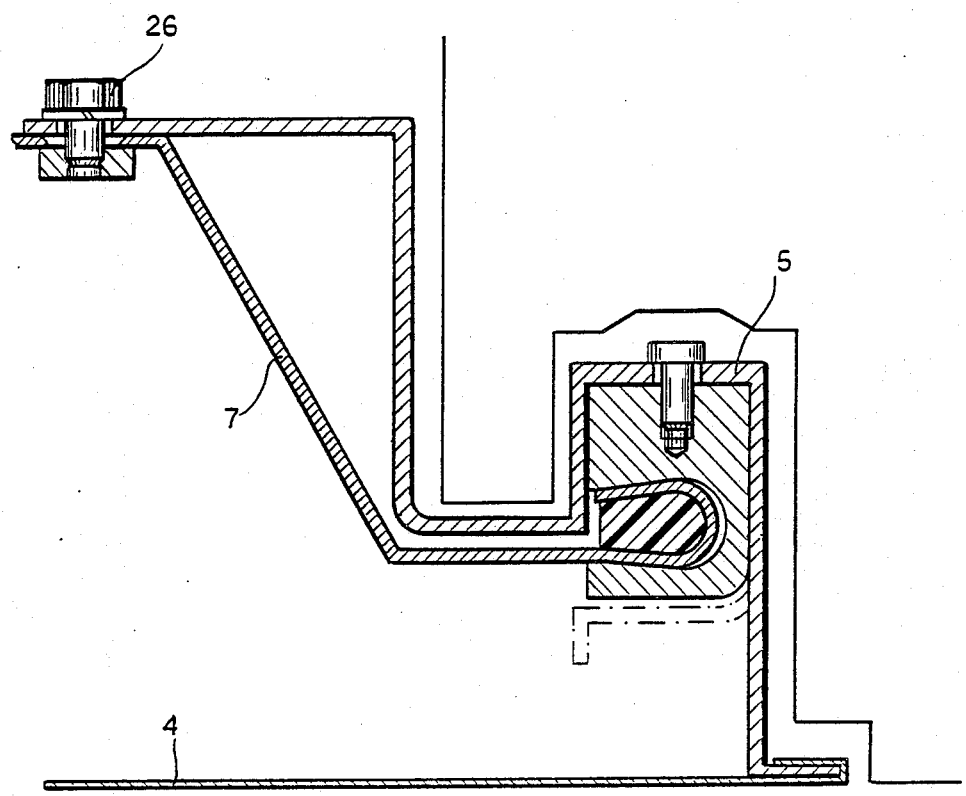
FIG. 9 is a view of a method for fastening a second tensile bracing band to the vertical strut.

As shown in FIG. 1, the second tensile bracing band 7 is secured by the vertical supports 5 and 6. These supports, in the embodiment shown in FIG. 9, are constructed so that they are longitudinally encompassed by the vertical supports of the car body and become hooked into them in case of a collision. The attachment of the second tensile bracing band 7 is accomplished in the manner shown in FIG. 8. By means of the bolt assembly 26 the tensile bracing band 7 is adjustable and at the same time it acts as a common support member.

Figure 10:
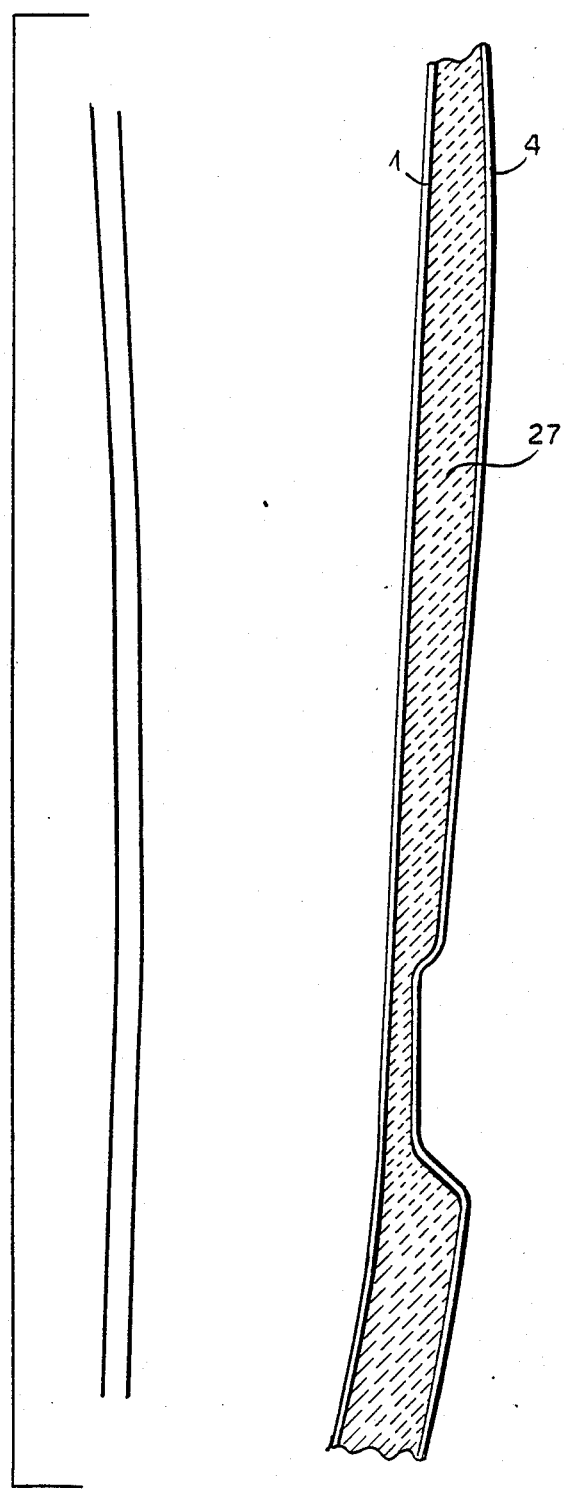
FIG. 10 is a detail view which shows the position of the tensile bracing band in the door structure.

In the space between the outer covering 4 of the door and the tensile bracing band, a filling material 27, e.g. acoustic insulating or impact absorbing polystyrene, is provided as shown in FIG. 10.

I claim:

1. A door reinforcement for protecting a car against sideways collision comprising:
    an upper and a lower rigid horizontal support parallel to one another, said upper rigid horizontal support having a recess therein and forming an outer sealing edge along an outward side of a window;
    an inner horizontal support positioned along an inner side of said window forming an inner sealing edge thereof; and
    at least one flexible pretensioned bracing band having first and second ends, said first and second ends attached to said upper and lower rigid horizontal supports, respectively, said first end penetrating into said recess and having adjacent thereto a wedge, said wedge becoming tighter when subjected to a tensile load on said bracing band.

2. A door reinforcement according to claim 1 wherein said first end of said bracing band penetrates as a bend profile into said recess.

3. A reinforcing door according to claim 1 wherein said lower rigid horizontal support has an inward facing C-shaped profile, said profile engaging within an outward facing C-shaped profile of a sill of said door.

4. A door reinforcement according to claim 3 wherein said second end of said bracing band penetrates into a slot within an arm of said C-shaped profile of said lower rigid horizontal support, a wedge being positioned in said slot adjacent said second end of the penetrating bracing band.

5. A door reinforcement according to claim 1 further comprising a means for adjusting tensile load on said tensile bracing band so as to chance the resonant frequency of said door.

6. A door reinforcement according to claim 1 wherein an outer covering of said door and said tensile bracing band define a space which is provided with a filling material.

7. A door reinforcement according to claim 1 wherein a second tensile bracing band is positioned behind a first tensile bracing band.

8. A door reinforcement according to claim 7 further comprising a vertical strut to which one of said tensile bracing bands is attached, said vertical strut being configured to fit conformably into an adjacent vertical strut of a body of said car.

* * * * *